US009785777B2

(12) United States Patent
Sharma et al.

(10) Patent No.: US 9,785,777 B2
(45) Date of Patent: Oct. 10, 2017

(54) STATIC ANALYSIS BASED ON ABSTRACT PROGRAM REPRESENTATIONS

(71) Applicant: International Business Machines Corporation, Armonk, NY (US)

(72) Inventors: Babita Sharma, Mississauga (CA); Andrew Mak, Richmond Hill (CA); Richard Myer Goldberg, Thornhill (CA); John Thomas Peyton, Jr., Arlington, MA (US); Jeffrey Charles Turnham, Newmarket (CA); Matthew Francis Murphy, Andover, MA (US); Hua Xiao, Markman (CA)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 14/576,469

(22) Filed: Dec. 19, 2014

(65) Prior Publication Data
US 2016/0180096 A1  Jun. 23, 2016

(51) Int. Cl.
G06F 21/57 (2013.01)
G06F 11/36 (2006.01)
G06F 21/14 (2013.01)

(52) U.S. Cl.
CPC ........ *G06F 21/577* (2013.01); *G06F 11/3604* (2013.01); *G06F 21/14* (2013.01); *G06F 2221/033* (2013.01); *G06F 2221/0724* (2013.01)

(58) Field of Classification Search
CPC combination set(s) only.
See application file for complete search history.

(56) References Cited

U.S. PATENT DOCUMENTS 6,275,986 B1 * 8/2001 Ewart .................... G06F 8/436
714/38.12
7,398,517 B2   7/2008 Berg et al.
(Continued)

OTHER PUBLICATIONS

Cousot, et al, "Modular Static Program Analysis," Proceedings of the Eleventh International Conference on Compiler Construction, 2002.
(Continued)

*Primary Examiner* — Taghi Arani
*Assistant Examiner* — Phy Anh Vu
(74) *Attorney, Agent, or Firm* — Jeffrey S. LaBaw; David H. Judson

(57) ABSTRACT

An application analysis platform enables automatic generation of abstract program representations (APRs) that are amenable to static analyzes for finding security vulnerabilities. The APR is generated automatically, preferably from an existing build system or a source repository, and then encapsulated into a binary archival format for consumption by a static analysis tool, which operates on-premises or in the cloud. The abstract program representation is a highly compact version of the actual source code it represents. The archival format obfuscates the source code that is subjected to the analysis, thus protecting it from being reverse-engineered when moved off-premises or otherwise shared with other users, teams and even organizations. Binary archive files generated separately from different source code components may be readily merged and analyzed together to provide more effective static data-flow analysis, even with respect to components that are built on different machines by different teams and at different times.

15 Claims, 6 Drawing Sheets

(56) References Cited

U.S. PATENT DOCUMENTS

| | | | |
|---|---|---|---|
| 8,055,682 B1 | 11/2011 | Boxmeyer et al. | |
| 2002/0062463 A1* | 5/2002 | Hines | G06F 8/36 714/38.14 |
| 2004/0260940 A1* | 12/2004 | Berg | G06F 8/43 726/25 |
| 2005/0108562 A1* | 5/2005 | Khazan | G06F 11/3604 726/23 |
| 2005/0198526 A1* | 9/2005 | Marr | G06F 21/14 726/22 |
| 2006/0080635 A1* | 4/2006 | Anwar | G06F 9/44521 717/100 |
| 2006/0129976 A1* | 6/2006 | Brand | G06F 8/10 717/109 |
| 2007/0106983 A1* | 5/2007 | Owen | G06F 9/45516 717/136 |
| 2007/0234304 A1* | 10/2007 | Berg | G06F 8/43 717/126 |
| 2007/0240138 A1* | 10/2007 | Chess | G06F 11/3612 717/143 |
| 2007/0250930 A1* | 10/2007 | Aziz | G06F 21/554 726/24 |
| 2008/0005796 A1* | 1/2008 | Godwood | G06F 21/564 726/24 |
| 2008/0016496 A1* | 1/2008 | Li | G06F 11/3624 717/124 |
| 2008/0072214 A1* | 3/2008 | Peyton | G06F 21/577 717/133 |
| 2008/0127113 A1* | 5/2008 | Wu | G06F 11/3644 717/129 |
| 2008/0301650 A1* | 12/2008 | Talluri | G06F 11/3409 717/135 |
| 2009/0113550 A1* | 4/2009 | Costa | G06F 21/52 726/25 |
| 2009/0144698 A1* | 6/2009 | Fanning | G06F 8/75 717/120 |
| 2010/0131721 A1 | 5/2010 | Title et al. | |
| 2010/0287214 A1* | 11/2010 | Narasayya | G06F 17/30306 707/805 |
| 2011/0078794 A1* | 3/2011 | Manni | G06F 21/566 726/23 |
| 2011/0087892 A1 | 4/2011 | Haviv et al. | |
| 2012/0102474 A1* | 4/2012 | Artzi | G06F 8/75 717/157 |
| 2013/0086299 A1* | 4/2013 | Epstein | G06F 12/1475 711/6 |
| 2013/0227693 A1* | 8/2013 | Dewey | G06F 9/44 726/25 |
| 2013/0276056 A1* | 10/2013 | Epstein | G06F 21/604 726/1 |
| 2014/0075420 A1* | 3/2014 | Queru | G06F 9/4411 717/134 |
| 2014/0090070 A1 | 3/2014 | Tripp | |
| 2014/0188746 A1 | 7/2014 | Li | |
| 2014/0189875 A1 | 7/2014 | Beskrovny et al. | |

OTHER PUBLICATIONS

"Static Code Analysis," OWASP, https://www.owasp.org/index.php/Static_Code_Analysis, Mar. 19, 2013.

Veracode Fact Sheet, "Binary Static Analysis," http://www.veracode.com/sites/default/files/Resources/Datasheets/binary-static-analysis-datasheet.pdf Dec. 2014.

Veracode Fact Sheet, "Mobile Application Security," https://info.veracode.com/datasheet-mobile-application-security.html, Dec. 2014.

Ren et al, "A Method for Detecting Software Vulnerabilities Based on Clustering and Model Analyzing," Journal of Computational Information Systems 7:4 (2011) 1065-1073.

IBM Security AppScan Standard, Data Sheet, Dec. 2013.

* cited by examiner

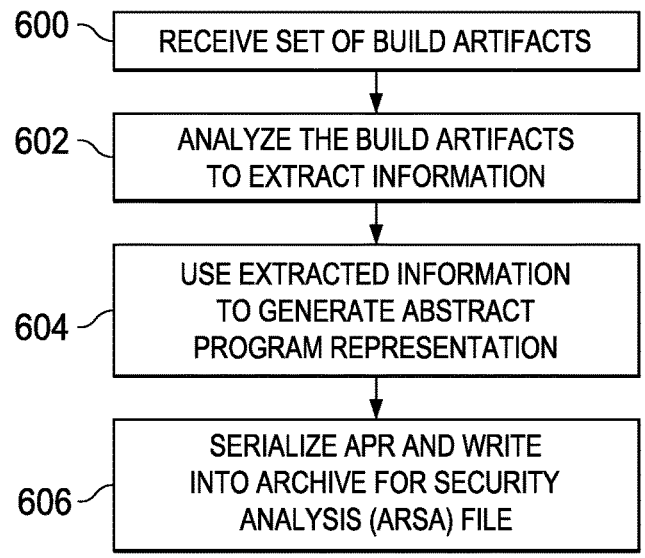

<project xmlns="http://maven.apache.org/POM/4.0.0" xmlns:xsi="
http://www.w3.org/2001/XMLSchema-instance"
xsi:schemaLocation="http://maven.apache.org/POM/4.0.0
http://maven.apache.org/maven-v4_0_0.xsd">
   <modelVersion>4.0.0</modelVersion>
   <groupId>com.mycompany.app</groupId>
   <artifactId>my-app</artifactId>
   <packaging>jar</packaging>
   <version>1.0-SNAPSHOT</version>
   <name>my-app</name>
   <url>http://mycompany.com</url>
   <dependencies>
      <dependency>
        <groupId>javax.servlet</groupId>
        <artifactId>servlet-api</artifactId>
        <version>2.5</version>
      </dependency>
   </dependencies>
</project>

FIG. 7

```
800
  ↘
<Target path="C:\myApp\target\my-app-1.0-SNAPSHOT.jar">
        <BuildInfo
classpath="C:myApp\target\classes;C:\myApp\lib\servlet-api-2.5.jar"
src_root="C:\myApp\src\main\java"/>
        </Target>
```

STATIC ANALYSIS BASED ON ABSTRACT PROGRAM REPRESENTATIONS

BACKGROUND OF THE INVENTION

Technical Field

This disclosure relates generally to identifying and remediating application vulnerabilities using static analysis tools.

Background of the Related Art

Today, most organizations depend on web-based software and systems to run their business processes, conduct transactions with suppliers, and deliver sophisticated services to customers. Unfortunately, many organizations invest little to no effort in ensuring that those applications are secure. Web-based systems can compromise the overall security of organizations by introducing vulnerabilities that hackers can use to gain access to confidential company information or customer data.

To address this deficiency, static analysis tools and services have been developed. Static security analysis (or "static analysis" for short) solutions help organization address web and mobile application vulnerabilities through a secure-by-design approach. This approach embeds security testing into the software development lifecycle itself, providing organizations with the tools they require to develop more secure code. Static analysis tools are often used by computer software developers to provide information about computer software while applying only static considerations (i.e., without executing a computer software application). Such tools simplify remediation by identifying vulnerabilities in web and mobile applications prior to their deployment, generating results (reports and fix recommendations) through comprehensive scanning, and combining advanced dynamic and innovative hybrid analyses of glass-box testing (run-time analysis, also known as integrated application security testing) with static taint analysis for superior accuracy. A representative commercial offering of this type is IBM® Security AppScan®, which enhances web application security and mobile application security, improves application security program management and strengthens regulatory compliance.

Typically, application analysis tools of this type are delivered to end users as traditional software packages, which the user is responsible for installing, configuring and maintaining. With this model, there are many obstacles to quickly and effectively incorporating security analysis into application development lifecycles. For example, prior to actually performing any security analysis, the user first needs to download and install the tool, address licensing and user management issues for the tool, and then understand where and how to integrate the functionality into existing build and development workflows. The user also has to have basic familiarity with the tool interface and how to configure the product for scanning. In addition to these basic challenges, additional obstacles often arise during use of the tool due to the sensitive nature of application security findings that the tool generates. In particular, because these findings can be used as a guide for a malicious user to attack an application, users typically are not willing to share security data, even with other teams in their own organization. This leads to several sub-optimal behaviors or outcomes, namely: little or no cross-team or cross-user collaboration on security analysis best practices or issue remediation, a lack of interaction or feedback loops between the user and the tool provider to help improve the analysis tool in terms of accuracy, performance or usefulness of the findings, as well as significant duplication of work, which occurs as many users scan the same source components.

BRIEF SUMMARY

An application analysis platform enables automatic generation of application metadata in the form of abstract program representations (APRs, each an APR) that are amenable to static data-flow analyses for finding security vulnerabilities. According to this disclosure, the ABR is generated automatically, preferably from either an existing build system or a source repository, and then encapsulated into a binary archive format for consumption by static application security tools, which may operate on-premises or via a cloud-based services platform.

The abstract program representation is a highly compact version of the actual source code it represents. Once the ABR is generated, preferably it is serialized and written into a binary archive file, which is referred to herein as an Archive for Security Analysis (ARSA) file. The ARSA file effectively obfuscates the source code that is subjected to the analysis, thus protecting it from being reverse-engineered even if it moved off-premises (into the cloud) or otherwise shared with other users, teams and even organizations. Further, ARSA files generated separately from different source code components may be readily merged and analyzed together to provide more effective static data-flow analysis, even with respect to components that are built on different machines by different teams and at different times. The use of component-specific ARSA files that can be readily merged and tested, e.g., in the cloud, also facilitates incremental static analysis of the application as a whole because changes to an individual component do not necessarily require re-generation and upload of ARSA files for other unaffected components.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 6 depicts a simple process flow of a first embodiment of this disclosure wherein a generator tool generates abstract program representations from code in a build system;

FIG. 7 is a representative example of a set of build artifacts for a code component that is converted into an abstract program representation and then a binary archive file according to this disclosure;

DETAILED DESCRIPTION OF AN ILLUSTRATIVE EMBODIMENT

Figure 1:
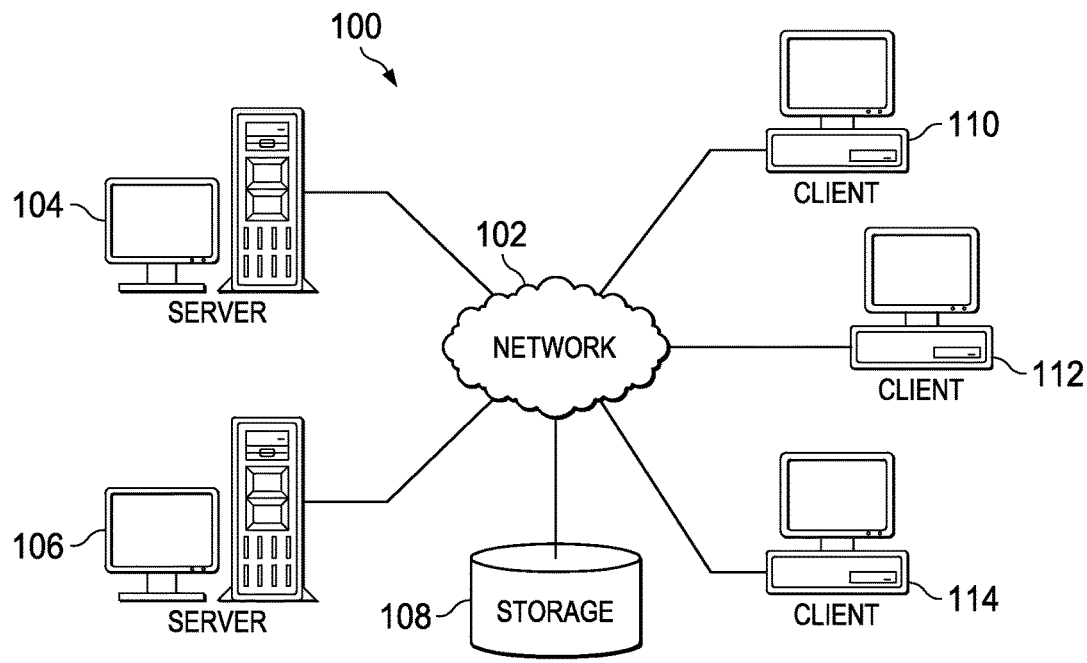
FIG. 1 depicts an exemplary block diagram of a distributed data processing environment in which exemplary aspects of the illustrative embodiments may be implemented.
Figure 2:
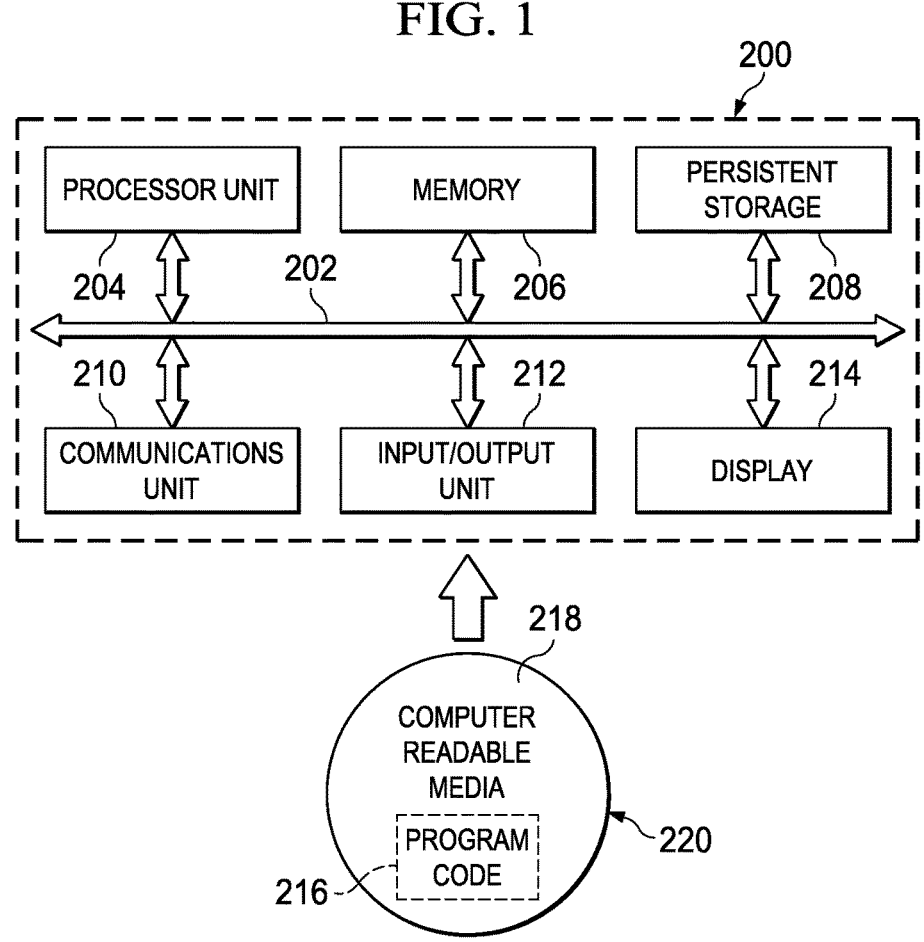
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
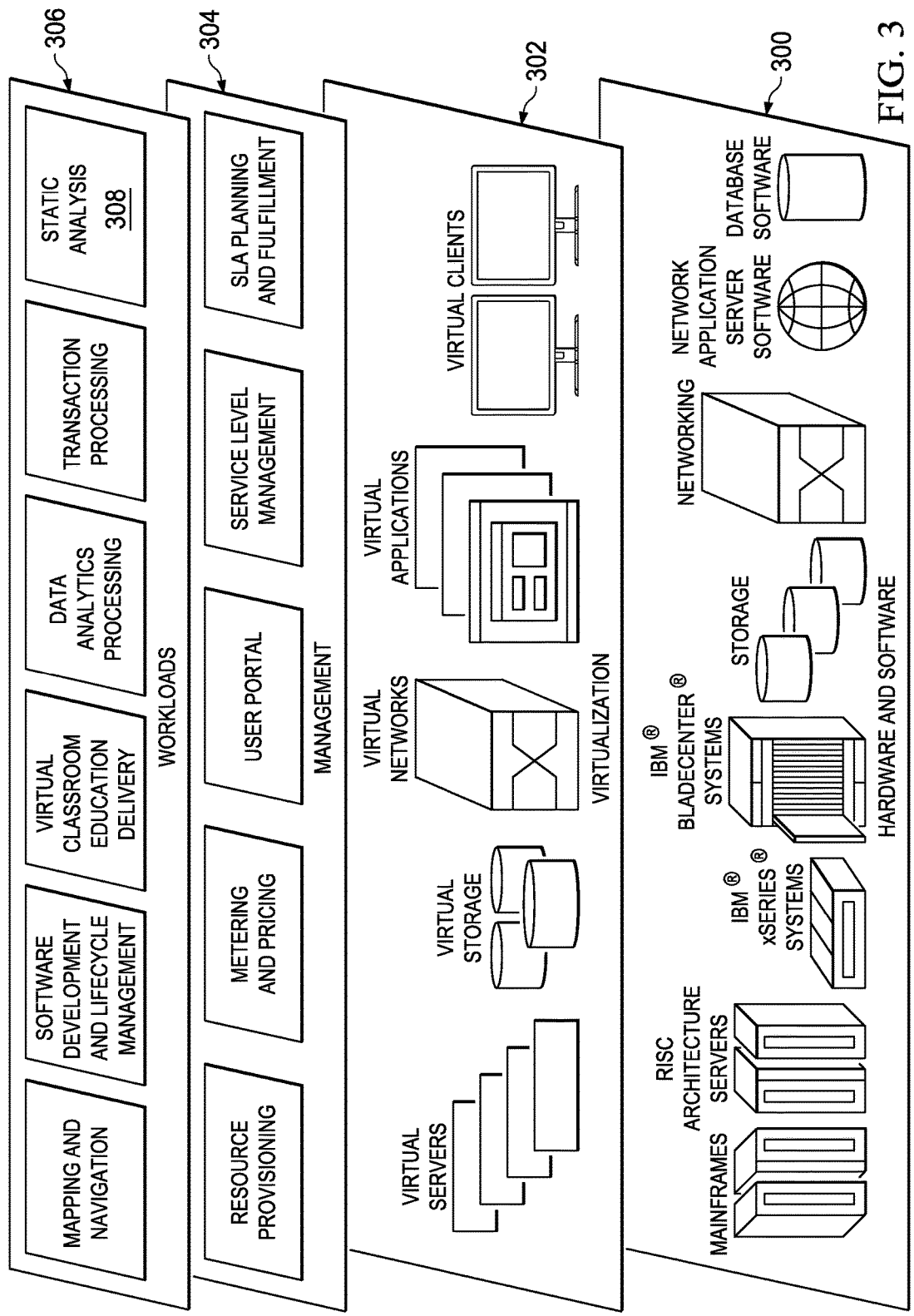
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; enterprise-specific functions in a private cloud; and, according to this disclosure, static security analysis 308.

It is understood in advance that although this disclosure includes a detailed description on cloud computing, implementation of the teachings recited herein are not limited to a cloud computing environment. Rather, embodiments of the disclosed technique are capable of being implemented in conjunction with any other type of computing environment now known or later developed. These include standalone computing environments (e.g., an on-premises desktop machine), client-server-based architectures, and the like.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System x® servers with VMware vSphere 4.1 Update 1 and 5.0.

In one embodiment, a static analysis tool, such as IBM AppScan Enterprise Edition, is implemented as a cloud-based application.

Static Analysis Tools and Services

As is well-known, static analysis tools are used by computer software developers to provide information about computer software while applying only static considerations (i.e., without executing a computer software application). More formally, and as used herein, the term "static program analysis" means an analysis of a static representation of an application. In one type of static analysis, data flows are traced within a computer software application from "sources," typically application programming interfaces (API) that introduce "untrusted" input into a program, such as user input, to "sinks," typically security-sensitive operations such as modifying a database. More generally, the term "sink" or "security sink" means a module, function or procedure that consumes in input value and performs an operation on the input value that is security sensitive.

Such flows are identified as security vulnerabilities that may require remediation, typically by ensuring that a flow that is identified as a security vulnerability encounters a "downgrader" that validates and/or sanitizes untrusted input, such as by checking whether the input contains illegal characters or is in an illegal format, both common tactics used in malicious attacks. Generalizing, a "downgrader" refers to a module, routing or function that endorses, sanitizes and/or validates input data. Static analysis tools that identify security vulnerabilities typically provide computer software developers with a short description of each type of security vulnerability found, and may even provide sample code snippets that may be used by the developer to construct a downgrader for remediating the security vulnerability.

In operation, a static program analysis may analyze a call-tree representing previously recorded call stacks of the application to identify security vulnerabilities that may be present in the application. The term "call stack" refers to a stack data structure that stores information about the active subroutines of a computer program, such as an application. Without limitation, the static security analysis typically takes the form of taint analysis, where the analysis is parameterized by a set of security rules, each rule being a triple <Source, San, Sink>, where Source denotes source statements that read untrusted user inputs, San denotes downgrader statements that endorse untrusted data by validating and/or sanitizing it, and Sink denotes sink statements which perform security-sensitive operations. Given a security rule R, any flow from a source in $Source_R$ to a sink in $Sink_R$ that does not pass through a downgrader from $San_R$ comprises a potential vulnerability. This approach thus reduces security analysis to a graph reachability problem.

During static analysis of the computer program, the security analysis application analyses the computer model represented by the control flow call-graph, to determine whether there are potential paths, during execution of the computer program, from the source to the sink without the user-provided data being downgraded by the downgrader. One such path is indicated in the call-graph by an edge. This path generally is undesirable, and may indicate a security vulnerability in the computer program. In this regard, the edge can represent a witness to a security vulnerability, and this witness is then reported as a "finding" to the user.

Figure 4:
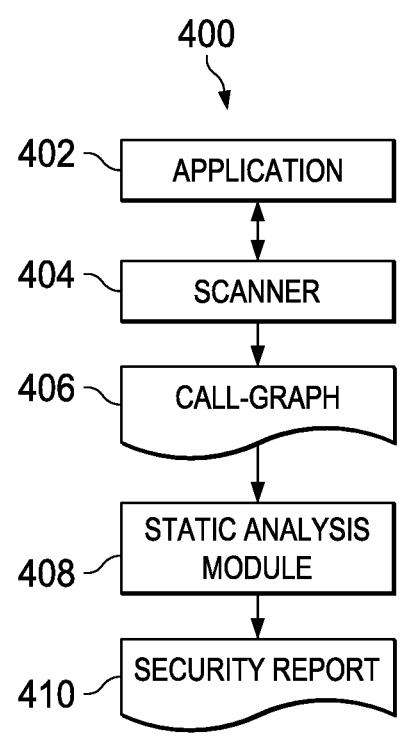
FIG. 4 is a block diagram illustrating a technique for analyzing vulnerable information flows in an application.

FIG. 4 is a block diagram illustrating a system 400 for analyzing vulnerable information flows in an application 402. In this known scenario, static analysis is used in addition to a black-box scan. As seen in FIG. 4, while the application 402 executes, the scanner 404 performs a scan of the application and, based on the scan, generates a call-graph 406 representing call stacks arising in the application during processing of test inputs provided to the application 402. The call-graph 406 may be pre-generated or provided from some other data source (e.g., a configuration file). As depicted, the system 400 includes a static analysis module 408 that performs a static analysis of the application 402. Specifically, the static analysis module 408 performs a static analysis of the call-graph 406 in which the call stacks identified by the black-box scanner 404 are recorded. As described above, in this way the static analysis module 408 can identify paths (i.e., flows) in the call-graph 406 that potentially represent security vulnerabilities in the application 402. For example, the static analysis module 408 can generate a security report 410 that indicates such paths as witnesses to security vulnerabilities. The security report 410 can be made to be available to a user in any suitable manner. For example, the security report 410 can be presented on a display, presented in a printout, stored to a file, or the like.

Static Analysis Using Abstract Program Representations (APRs) and Associated Archive Files With the above as background, the subject matter of this disclosure is now described.

As described generally above, this disclosure provides for an application analysis platform that enables automatic generation of abstract program representations (APRs, each an APR) that are amenable to static data-flow analyses for finding security vulnerabilities. As used herein, an abstract program representation refers to a highly-compact version of the actual source code it represents. According to this disclosure, an APR for a particular source code component is generated automatically, preferably from either an existing build system or a source repository, and it is then encapsulated into a particular binary format for consumption by static application security tools, which may operate on-premises or via a cloud-based services platform.

Figure 5:
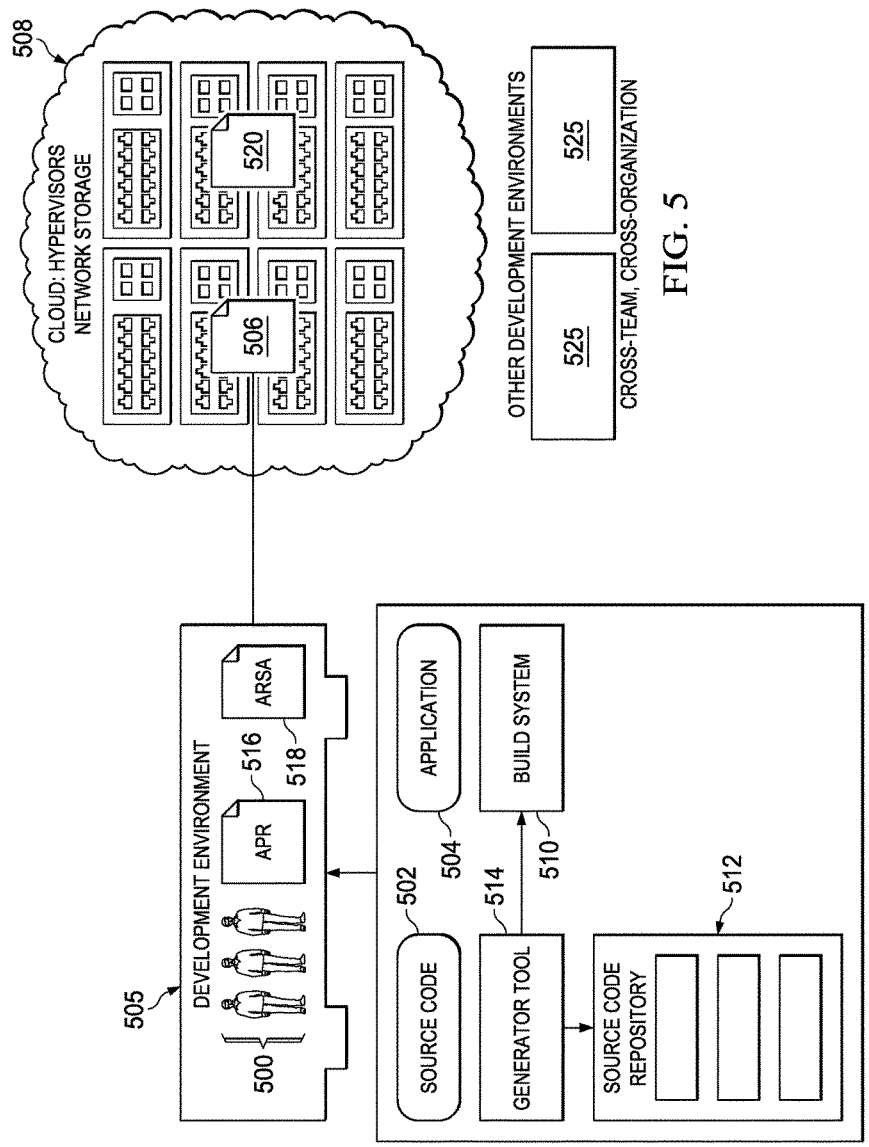
FIG. 5 is a representative computing environment in which the techniques of this disclosure may be implemented.

FIG. 5 illustrates an exemplary operating environment in which the techniques of this disclosure may be implemented. In this example environment, an on-premises development team 500 is responsible for developing a source code component 502 for an application 504. There may be one or more other development teams, and those teams may be co-located with development team 500, or located elsewhere. The application comprises multiple such components, and, with respect to a particular development location or time, any particular component may be undergoing development, modification, updating, or the like. As depicted, the environment includes a Static Analysis Security Testing (SAST) tool or agent 506 that, as is well-known and as described above (e.g., FIG. 4), is used to scan source code to identify potential security vulnerabilities, and that provides developers with assistance to triage and fix those identified vulnerabilities. The static analysis tool 506 operates either on-premises, or in a cloud-based platform 508. An on-premises solution may be a standalone (e.g., desktop) product (e.g., FIG. 2), a network-based client-server solution (e.g., FIG. 1), a web-based solution, or the like. The particular details of how the static analysis tool operates are not an aspect of this disclosure, although typically the tool will operate in the manner described above.

As also depicted, the environment typically includes a build system 510, and a source code repository 512. According to this disclosure, new tooling is provided in the form of a generator tool 514. The generator tool, as will be described below, is the mechanism that automatically generates abstract program representations (APRs, each an APR 516) with respect to the source code component 502 of the application 504. There may be one or more abstract program representations APRs per code component, and an APR may be used by more than one code component. As noted above, the APR is a compact version of the actual source code it represents. The generator tool 514 creates the APR automatically, preferably from code generated within the build system 510 itself (i.e., on-the-fly as the code is built), or by integrated directly with the source code repository 512 that stores components already developed.

The generator tool 514 includes an additional important function, namely, it operates to encapsulate the APR into a binary archive file, which is referred to herein as an "Archive for Security Analysis" (ARSA) file 518. The ARSA file is sometimes referred to herein as a "container" because it contains the abstract program representation, albeit in a form that does not expose details regarding the source code from which the APR is generated. In a preferred approach, an ARSA file for an APR is created by serializing the APR into a compact binary file format container that preferably contains only the data necessary for static application security analysis. The ARSA file 518 effectively obfuscates the source code that will be subjected to the static analysis. Preferably, this obfuscation is accomplished with encryption and/or direct manipulation and translation of sensitive data into generic data that would be unhelpful to malicious users. With this approach, the ARSA file 518 is protected from being reverse-engineered even if it moved off-premises (into the cloud) or otherwise shared with other users, teams and even organizations. The ARSA file has a reduced amount of data, thereby reducing the bandwidth required to transport it across the network, e.g., to cloud-based platform 508.

The generator tool 514 typically is implemented in software, e.g., as a set of computer program instructions executed by one or more hardware processors. A particular generator tool may comprise any number of programs, processes, execution threads, and the like, together with appropriate databases to support data used or created by the tool. The tool may be configured or administered with a web-based front-end, via a command line, or the like. The tool may include one or more functions that are implemented programmatically, or that interoperate with other computing entities or software systems via an application programming interface (API), or any convenient request-response protocol. One component of the generator tool 514 may be used to create the APR, while a second component of the generator tool 514 may be used to convert the APR into the ARSA file. These functions may be separate or distinct, co-located or separated, or implemented with distinct tools, modules, programs, processes or devices. The particular nomenclature of the "tool" is provided merely for illustration purposes and is not intended to limit this disclosure.

As will be described, a further feature of this disclosure is that ARSA files generated separately from different source code components 502 may be readily merged and analyzed together to provide more effective static data-flow analysis, even with respect to components that are built on different machines by different teams and at different times. This merging function typically occurs in the cloud platform 508 and thus is indicated by the merge function 520. The merge function 520 may be implemented on-premises as well, or in a system or location dedicated to this operation. As will be seen, the use of component-specific ARSA files that can be readily merged and tested, e.g., in the cloud, also facilitates incremental static analysis of the application as a whole because changes to an individual component do not necessarily require re-generation and upload of ARSA files for other unaffected components.

As also seen in FIG. 5, typically the cloud platform 508 interoperates with other development environments 525 that may be located remotely from the main development environment 505 shown, and that include other users, teams and/or organizations. As will be seen, the approach described herein facilitates cross-user collaboration within the development environment 505, as well as cross-team and cross-organization collaboration across the environments 505 and 525. This collaboration may occur even with the parties remaining anonymous from one another with respect to the code component ARSAs that are provided to the cloud platform and merged there by the merge function 520.

With the above as further background, the following provides additional details regarding the APR and how it is converted into an ARSA file. Without intending to be limiting, a typical Abstract Program Representation (ABR) for a source code component may be described as follows:

Abstract Program Representation={function-declarations, function-definitions, global-variables, class-fields} function-definition={function-name, formal-variables, local-variables, operations} function-declaration={function-name, formal-variables} operations={call-operation, assignment-operation, return-operation, field-load-operation, field-store-operation} call-operation=simple-call-operation or virtual-call-operation simple-call-operation={caller-signature, callee-signature, arguments} virtual-call-operation={caller-signature, callee-signature, arguments, virtual-overrides}, and so on.

In a first embodiment, the abstract program representations are generated automatically from existing build systems in the development environment. In this embodiment, the generator tool interfaces to the build system over an application programming interface (API), or via some other request-response communication protocol. The particular technique by which the generator tool interfaces to the build system is not intending to be limited.

The basic operation is shown in the process flow in FIG. 6. At step 600, a set of build artifacts is received. The routine then continues at step 602 to analyze the build artifacts to extract certain information, such as the paths to the build outputs, the paths to the source code directories, compile-time dependencies, and the like. At step 604, the information obtained from the analysis in step 602 is used to generate the APR. At step 606, the APR is then converted into the ARSA file to complete the process. The ARSA file is then consumed by the SAST tool, either locally or following transport to the cloud.

Preferably, the process shown in FIG. 6 operates autonomously and in an automated manner, generating the ARSA file as the set of build artifacts are received or otherwise made available.

The following provides a more concrete example. In this embodiment, the APR is generated from the source code component by analyzing build artifacts (e.g., such as a Maven pom.xml file, an Ant build.xml file, or the like) to extract preferably the following information: the paths to the build outputs (e.g. *.jar, *.war, etc.), the path(s) to the source code directories, and the compile-time dependencies. This information is then fed to an engine that uses known transformation methods and optimizations to produce the APR. One technique for generating the APR in this manner is described in U.S. Pat. No. 7,398,517, which is owned by the assignee of this application, and the disclosure of which is incorporated herein by reference. Then, and as noted above, the abstract program representation is serialized into binary and/or encrypted, and included within an ARSA file. As described, these operations preferably are performed by the generator tool, which is sometimes referred to herein as the "ARSA generator."

Figures 8, 9, 10:
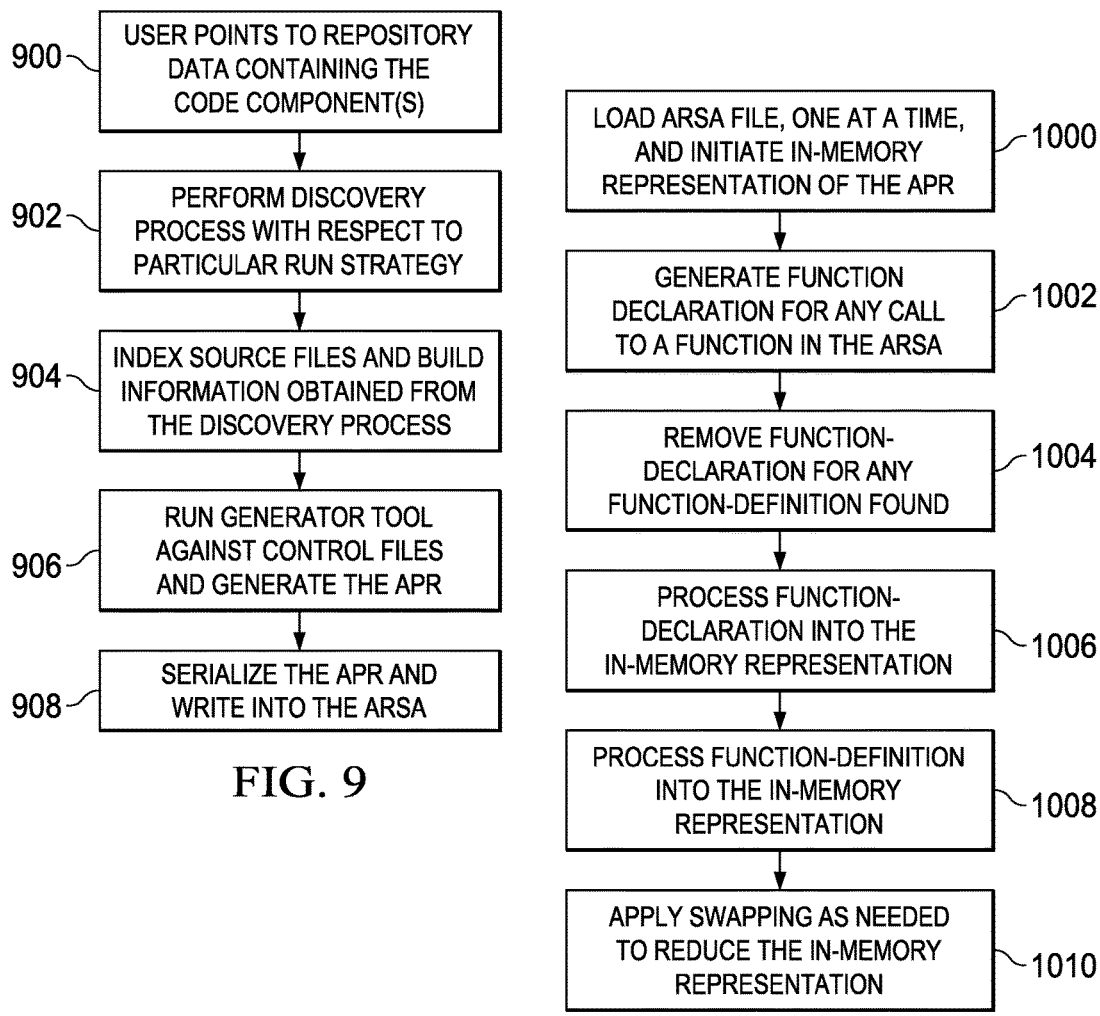
FIG. 8 is the information extracted from the build artifact set shown in FIG. 7 and useful to generate an APR.
FIG. 9 depicts a second embodiment of this disclosure wherein a generator tool generates the APR from code obtained in a source code repository.
FIG. 10 illustrates a merge operation wherein binary archive files from multiple components of an application are merged prior to consumption by a static analysis tool.

FIG. 7 illustrates an example set of build artifacts located in directory "C:\myApp" and created by the build system for a particular source code component. These artifacts are located in a Maven pom.xml file 700, which is exemplary. Using the Maven API, the following information can then be determined automatically, namely, the build output (e.g., C:\myApp\target\my-app-1.0-SNAPSHOT.jar), the location of the source files (e.g., C:\myApp\src\main\java), and the compile time dependency (e.g., servlet-api-2.5.jar). The jar file in the build output is the file that has to be analyzed by the static analysis tool. The source files are located under C:\myApp\src\main\java, and this information is useful in mapping the results or security findings back to the source code to help the users with issue resolution. The compile-time dependency is used while building the abstract program representation for the jar file. According to this embodiment, the generator tool constructs an XML representation of the above data, with the result 800 as shown in FIG. 8. The XML file 800 is then used to generate the APR for the target "my-app-1.0-SNAPSHOT.jar". This APR is then serialized into binary and/or encrypted to generate the ARSA file. As noted, the ARSA file is adapted for consumption by the static application security testing (SAST) tool. Because the underlying data-model and encodings used for the abstract program representation are proprietary to the developer(s), it is extremely difficult to reverse engineer the original source code from the ARSA file.

According to an alternative embodiment, the abstract program representation is generated from the source repository. This approach typically involves the operations shown in the process flow in FIG. 9. The operation begins at step 900 with the user pointing to the repository data containing the code component(s) that need to be scanned by the SAST tool. At step 902, a discovery operation is initiated. In particular, and in order to handle any arbitrary code extracted from source repositories, the discovery process 902 preferably is designed to be extensible with technology-specific run strategies. A given run strategy determines whether a build artifact is a target (that is, a container of other targets and files), or a file for which abstract program representation should be generated. The relationship between targets and files lends itself well to a file system hierarchy. Thus, in one example, the discovery operation simply identifies a containing directory as a target, and then crawls through the directory to collect files of recognizable extension types. In a more complex run strategy, the discovery operation treats the directory as a "project," e.g., from an Integrated Development Environment IDE, e.g., Eclipse, or Visual Studio. In either case, the discovery operation extracts the metadata from such a project to find the build dependencies that would be needed for the generation of the abstract program representation. In yet another example that involves a yet more complex run strategy, the discovery operation works by transforming the source it finds into other formats (e.g., building of C/C++ into object code) as required. In these example scenarios, which are not intended to be limited, a target does not necessarily have to physically contain the files under it. For example, an Ant build XML file can be thought of as a target that "contains" the files that the build produces, and this relationship is dictated by an appropriate Ant run strategy that understands the structure of build XML files.

Generalizing, the discovery process 902, either alone or in combination with the one or more technology-specific run strategies, takes as input source code extracted from a repository, and then identifies the targets, files and related build information that are present. The various run strategies may be quite varied, e.g., a scan target file strategy, a directory-based strategy, an Eclipse Workspace strategy, a build.xml strategy, a custom run strategy, and others. The discovery process enables the generator tool to find build artifacts when available (e.g., by file browsing and direct pointing), and to distinguish non-build outputs identified during directory browsing from build objects (e.g., class files, EARs, WARs, JARs, EXEs, DLLs, etc.) throughout the code tree.

The process then continues at step 904 to index the artifacts (i.e. source files and build information). At this step, the data collected from the discovery process is written out to a series of control files that mirrors the hierarchy of targets and files. These control files act as instructions to the generator tool and, in particular, to pinpoint the source files that the generator needs to process. At step 906, the generator tool is executed against these control files to generate the abstract program representation. At step 908, the APR is serialized and/or encrypted, and written into the ARSA file to complete the process.

Preferably, the ARSA file generated in this manner is uploaded back to the source repository and stored together with the code that it was generated from. This enables the ARSA file to be sent for security scanning whenever needed. Moreover, when other components use the code in question (likely in the form of a library), other users may access the repository, obtain the ARSA, and then stitch together the component's APR with that of the other components. This notion of stitching together abstract program representations from multiple ARSA files for an accurate whole-application analysis is an additional benefit of this disclosure, and a preferred technique for implementing this merging operation is now described.

As has been described in the two (2) embodiments above, the technique of this disclosure provides for building ARSA files automatically, e.g., by plugging the ARSA generator tool into a build system (FIG. 6), or by pointing it to a source repository (FIG. 9), to thereby create a library of ARSA files that can be pulled in for analysis whenever required. This analysis is sometimes referred to herein as a "whole-application" analysis, wherein different components of the application, although built at different times, different locations, or by different teams, are still scanned together as an integrated or unitary whole. This analysis also is useful for "incremental" analysis, wherein an individual component of the whole is updated and modified, with the result updated or modified ARSA then re-integrated into the whole and the result then scanned.

FIG. 10 is a process flow of a method for componentized analysis of multiple code components according to this approach. The code components are assumed to have been built on one or more different machines or development environments, at different times, by different teams, and so forth. Each component has an associated APR (or multiple of them) as embodied in an ARSA file, all as described. The described method is operative to automatically merge the abstract program representations from multiple ARSA files generated separately for different components, and to analyze them together. In the described method, preferably the linkages between function calls made from one ARSA file (i.e., one component) to another are established at analysis time, and the data flow analysis can trace the end-to-end flow of data from one component to another.

The method begins at step 1000 by loading the ARSA file, one at a time, to build an in-memory representation of the component's APR. Several parsing steps are then carried out. In particular, at step 1002, if a call to a function is found in the ARSA file, a function-declaration is then generated for that call. At step 1004, if a function-definition is found, the function-declaration for that function-definition is removed, and only its function-definition object is maintained.

At step 1006, and while reading a function-declaration from an ARSA file that is being processed currently into the in-memory representation ("current_arsa"), the routine provides additional processing. In particular, if a function-definition with a same signature already exists in the in-memory representation built so far, a new object for the function-declaration is not built, but all call operations in the current_arsa that point to this function-declaration are updated to point to the function-definition. If, however, a function-declaration with the same signature already exists in the in-memory representation built so far, an object for the function-declaration is not built, but all call operations in the current_arsa that point to this function-declaration are updated to point to the existing function-declaration. If no-definition or -declaration for this signature exists, a new function-declaration object is created and added to the in-memory representation.

At step 1008, and while reading a function-definition from the ARSA file, the routine provides additional processing. In particular, if a function-declaration with the same signature already exists in the in-memory representation built so far, the function-declaration is removed, the new function-definition is added, and all existing call-operations that point to the function-declaration are updated to point to the new function-definition. If, however, a function-definition with the same signature already exists in the in-memory representation, the routine applies some heuristics (e.g., version number of the function-definition, the content of the function-definition, a user-chosen function-definition, etc.), and then removes the existing function-definition and adds the selected function-definition (as determined by the heuristics). All call-operations that point to the removed function-definition are then pointed to the selected one.

The above-described steps are applied to each ARSA file to be combined. It ensures that the same analysis result will occur (for the whole-application analysis) regardless of the loading order of the ARSA files.

Finally, at step 1010, one or more swapping techniques may be applied to the in-memory representation to reduce its size. This is a known technique that is optional here. One such approach for memory management to support large-scale static analysis using this swapping technique is described in U.S. Publication No. 20100131721, which is owned by the assignee of this application.

Without limitation, typically the merge operation described by the process flow in FIG. 10 is carried out in the cloud platform, with one or more component ARSA files provided from one or more distinct sources.

The techniques described herein provide numerous advantages. The approach can be integrated easily with existing build systems or code repositories. As noted above, existing SAST tools require source code or compiled files (e.g., .class files) to do the analysis. When the SAST tool is on the cloud as a service, users of SAST tools need to upload a large number of source files or compiled files to the server to scan the application for security vulnerabilities. By providing just ARSA files, in the manner described, provides numerous advantages. These files contain only the data necessary for static application security analysis. The approach thus reduces the amount of data that users need to transfer via the network. Moreover, because the uploaded data is generated using proprietary transformations and encodings (and/or protected by encryption), there is no way to reverse engineer the abstract program representation to get the original source or byte code. As a result, and as compared to uploading source code or compiled files (such as .class files), the approach described herein (transferring ARSA on the Internet) is safe even if a hacker gets access to the files while they are being uploaded.

An additional advantage is provided by creating and storing ARSA files as-needed. In this manner, files can be readily merged to facilitate whole-application analysis, even as individual components are changed or updated. Indeed, the approach supports incremental static analysis such that when one component of an application is changed, the user need not regenerate and re-upload the ARSA files for all the components of the application. Rather, the user can simple generate the ARSA files for the updated/changed components and still get results for the whole application because the merge preferably is done in the cloud.

The described approach is preferably web- or cloud-based, thereby avoiding traditional installation and deployment troubles that often accompany SAST tools. The techniques provide for lightweight tooling (the generator tool) to generate obfuscated application metadata (the abstract program representation) that users can feel comfortable uploading off-site. The approach thus promotes simple and effective cross-user, cross-team and cross-organization collaboration with sufficient anonymity to alleviate or ameliorate security concerns. Indeed, the approach here may be implemented by users that are entirely anonymous to one another. By simplifying the manner in which static analysis is performed, the approach also facilitates application analytics and enables users to collaborate much more efficiently and effectively. Given the protections and functionalities afforded by the described technique, a cloud-based security analysis platform may even expose these functionalities on a crowd-sourced basis.

Preferably, the techniques herein are implemented in associated with a static analysis tool, such as IBM Security AppScan Source. In this example, the call-graph is generated by parsing the source code, first to generate the abstract program representation, and then using the APR to build a call-graph. The reference to this commercial product is exemplary and should not be taken to limit the disclosed technique, which may be implemented on any appliance (or, more generally, machine) having the general characteristics and operating functionality that has been described.

This subject matter may be implemented as-a-service. As previously noted, and without limitation, the subject matter may be implemented within or in association with a cloud deployment platform system or appliance, or using any other type of deployment systems, products, devices, programs or processes. As has been described, the generator tool functionality may be provided as a standalone function, or it may leverage functionality from other products and services.

A representative cloud application platform with which the APR/ARSA generation service may be implemented includes, without limitation, any cloud-supported Static Application Security Testing (SAST) framework, product or service.

Generalizing, the techniques herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the generator service be executed by a particular component as named above, as the functionality herein (or any aspect thereof) may be implemented in other or systems.

The generator functionality can interact or interoperate with security analytics systems or services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

As noted, and in addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the security assurance service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, static security analysis tools and systems, and cloud-based systems, as well as improvements to the functioning of software development tools and methods.

Having described our invention, what we now claim is as follows.

The invention claimed is:

1. A method of improving static security analysis, comprising:
   receiving, at a cloud platform, a binary archive container, the binary archive container securing a source code component from being reverse-engineered from a compact representation of the source code component, the compact representation identifying at least a path to one or more source code directories and at least one compile time dependency, the compact representation having been generated in an automated manner in a development environment by a generator tool that receives a set of build information associated with the source code component, and analyze the set of build information, the binary archive container having been generated by transforming the compact representation;
   merging the binary archive container with at least one other binary archive container received at the cloud platform from a distinct development environment to create a merged binary archive container; and
   performing, on the cloud platform, a static security analysis on the merged binary archive container instead of on the source code component or any compiled version thereof.

2. The method as described in claim 1, wherein the build information is received from a build system as the set of build information is generated.

3. The method as described in claim 1, wherein the build information is received from a source code repository in association with a discovery operation.

4. The method as described in claim 3 further including:
   identifying, based on a run strategy, one or more source files that, together with the set of build information, are used to generate the compact representation.

5. The method as described in claim 1 further including:
   the receiving at the cloud platform a new binary archive container that has been generated in the development environment upon updating the source code component;

generating a new merged binary archive container; and performing the static security analysis on the new merged binary archive container.

6. Apparatus, comprising:

one or more processors; and computer memory holding computer program instructions executed by the one or more processors for improving static security analysis, the computer program instructions operative to:

receive, at a cloud platform, a binary archive container, the binary archive container securing a source code component from being reverse-engineered from a compact representation of the source code component, the compact representation identifying at least a path to one or more source code directories and at least one compile time dependency, the compact representation having been generated in an automated manner in a development environment by a generator tool that receives a set of build information associated with the source code component, and analyze the set of build information, the binary archive container having been generated by transforming the compact representation;

merge the binary archive container with at least one other binary archive container received at the cloud platform from a distinct development environment to create a merged binary archive container; and perform, at the cloud platform, a static security analysis on the merged binary archive container instead of on the source code component or any compiled version thereof.

7. The apparatus as described in claim 6, wherein the build information is received from a build system as the set of build information is generated.

8. The apparatus as described in claim 6, wherein the set of build information is received from a source code repository in association with a discovery operation.

9. The apparatus as described in claim 8, wherein the computer program instructions are further operative to:

identify, based on a run strategy, one or more source files that, together with the set of build information, are used to generate the compact representation.

10. The apparatus as described in claim 6, wherein the computer program instructions are further operative to:

receive at the cloud platform a new binary archive container that has been generated in the development environment upon updating the source code component;

generate a new merged binary archive container; and perform the static security analysis on the new merged binary archive container.

11. A computer program product in a non-transitory computer readable medium for use in one or more data processing systems, the computer program product holding computer program instructions executed by the one or more data processing systems for improving static security analysis, the computer program instructions operative to:

receive, at a cloud platform, a binary archive container, the binary archive container securing a source code component from being reverse-engineered from a compact representation of the source code component, the compact representation identifying at least a path to one or more source code directories and at least one compile time dependency, the compact representation having been generated in an automated manner in a development environment by a generator tool that receives a set of build information associated with the source code component, and analyze the set of build information, the binary archive container having been generated by transforming the compact representation;

merge the binary archive container with at least one other binary archive container received at the cloud platform from a distinct development environment to create a merged binary archive container; and perform, at the cloud platform, a static security analysis on the merged binary archive container instead of on the source code component or any compiled version thereof.

12. The computer program product as described in claim 11, wherein the build information is received from a build system as the set of build information is generated.

13. The computer program product as described in claim 11, wherein the set of build information is received from a source code repository in association with a discovery operation.

14. The computer program product as described in claim 13, wherein the computer program instructions are further operative to:

identify, based on a run strategy, one or more source files that, together with the set of build information, are used to generate the compact representation.

15. The computer program product as described in claim 11, wherein the computer program instructions are further operative to:

receive at the cloud platform a new binary archive container that has been generated in the development environment upon updating the source code component;

generate a new merged binary archive container; and perform the static security analysis on the new merged binary archive container.

* * * * *